United States Patent
Wang et al.

(10) Patent No.: US 10,616,475 B2
(45) Date of Patent: Apr. 7, 2020

(54) PHOTO-TAKING PROMPTING METHOD AND APPARATUS, AN APPARATUS AND NON-VOLATILE COMPUTER STORAGE MEDIUM

(71) Applicant: BEIJING BAIDU NETCOM SCIENCE AND TECHNOLOGY CO., LTD., Beijing (CN)

(72) Inventors: Fujian Wang, Beijing (CN); Fuguo Zhu, Beijing (CN); Errui Ding, Beijing (CN); Long Gong, Beijing (CN); Yafeng Deng, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/543,969
(22) PCT Filed: Nov. 13, 2015
(86) PCT No.: PCT/CN2015/094578
§ 371 (c)(1),
(2) Date: Jul. 14, 2017
(87) PCT Pub. No.: WO2017/045258
PCT Pub. Date: Mar. 23, 2017

(65) Prior Publication Data
US 2018/0007259 A1  Jan. 4, 2018

(30) Foreign Application Priority Data
Sep. 18, 2015  (CN) .......................... 2015 1 0599253

(51) Int. Cl.
*H04N 5/232* (2006.01)
*G06K 9/00* (2006.01)
*G06K 9/62* (2006.01)

(52) U.S. Cl.
CPC ..... *H04N 5/23222* (2013.01); *G06K 9/00248* (2013.01); *G06K 9/00255* (2013.01);
(Continued)

(58) Field of Classification Search
USPC .................................................. 386/223–224
See application file for complete search history.

(56) References Cited

U.S. PATENT DOCUMENTS

2003/0212552 A1* 11/2003 Liang ................. G06K 9/00268
704/231
2004/0240708 A1* 12/2004 Hu .......................... G06F 3/012
382/103
(Continued)

FOREIGN PATENT DOCUMENTS

CN  101661557 A  3/2010
CN  103369214 A  10/2013
(Continued)

OTHER PUBLICATIONS

International Search Report for PCT/CN2015/094578, dated Jul. 1, 2016, and its English translation provided by WIPO.
(Continued)

*Primary Examiner* — Hung Q Dang
(74) *Attorney, Agent, or Firm* — Ladas & Parry, LLP (57) ABSTRACT

The present disclosure provides a photo-taking prompting method and apparatus, an apparatus and a non-volatile computer storage medium. On the one hand, a user's image information is collected while the user finds view, then the user's face posture information is obtained from the image information, then face posture information of a preset photo-taking template is compared with the user's face posture information, and the user is prompted to adjust the face posture according to a comparison result. The technical solutions provided by embodiments of the present disclosure may implement prompting the user's face posture adjustment while the user finds view and thereby implement providing guidance for the user's face posture, and solve the problem in the prior art about failure to perform photo-taking guidance while the user finds view.

15 Claims, 3 Drawing Sheets

(52) U.S. Cl.
CPC ....... *G06K 9/6202* (2013.01); *H04N 5/23219* (2013.01); *H04N 5/23293* (2013.01)

(56) References Cited

U.S. PATENT DOCUMENTS

| | | | | |
|---|---|---|---|---|
| 2006/0210121 | A1* | 9/2006 | Nakano | G06K 9/0061 382/117 |
| 2014/0185924 | A1* | 7/2014 | Cao | G06K 9/00281 382/159 |
| 2014/0254891 | A1 | 9/2014 | Lee et al. | |
| 2016/0300100 | A1* | 10/2016 | Shen | G06K 9/00248 |
| 2016/0379072 | A1* | 12/2016 | Fan | G06K 9/00248 382/118 |

FOREIGN PATENT DOCUMENTS

| | | |
|---|---|---|
| CN | 103716539 A | 4/2014 |
| CN | 103916579 A | 7/2014 |
| CN | 104182741 A | 12/2014 |
| CN | 104506721 A | 4/2015 |
| CN | 104754218 A | 7/2015 |
| CN | 105205462 A | 12/2015 |

OTHER PUBLICATIONS

Written Opinion of the International Search Authority for PCT/CN2015/094578, dated Jul. 1, 2016, and its English translation provided by Bing.Com Microsoft Translator.

From CN 201510599253.X, First Office Action and search report, dated Jan. 4, 2018, with English translation from Global Dossier.

From CN 201510599253.X, Second Office Action, dated Sep. 13, 2018, with English translation from Global Dossier.

From PCT/CN2015094578, International Preliminary Report on Patentability, dated Mar. 20, 2018, with English translation from WIPO.

From PCT/CN2015094578, Written Opinion of the International Searching Authority, dated Jul. 1, 2016 with English translation from WIPO.

* cited by examiner

PHOTO-TAKING PROMPTING METHOD AND APPARATUS, AN APPARATUS AND NON-VOLATILE COMPUTER STORAGE MEDIUM

CROSS-REFERENCE TO RELATED APPLICATIONS

The present application is the U.S. National Phase of PCT Application PCT/CN2015/094578 filed on Nov. 13, 2015, which claims priority to the Chinese patent application No. 201510599253.X entitled "Photo-taking Prompting Method and Apparatus" filed on Sep. 18, 2015, the disclosures of which are hereby incorporated by reference in their entireties.

FIELD OF THE DISCLOSURE

The present disclosure relates to the technical field of image processing, and particularly to a photo-taking prompting method and apparatus, an apparatus and a non-volatile computer storage medium.

BACKGROUND OF THE DISCLOSURE

As terminals increasingly prevail and functions become stronger and stronger, a photo-taking function of the terminal is extensively used by the user, more and more users use a mobile phone, a tablet computer or the like to take photos very conveniently and fast. At present, applications related to photo-taking are mainly camera-like applications and photo beautification-like applications.

In the prior art, the camera-like applications means displaying a frame on an interface to identify the user's face position while the user fines view. The photo beautification-like applications are used to perform post-processing for the captured photos to beautify images. However, post-processing for the captured images only means beautifying skin, beautifying color and the like and cannot change the user's face posture. Therefore, how to provide the user with photo-taking guidance while the user fines view is a problem urgently to be solved.

SUMMARY OF THE DISCLOSURE

In view of the above, embodiments of the present disclosure provide a photo-taking method and apparatus, an apparatus and a non-volatile computer storage medium, to prompt to adjust the user's face posture while the user finds the view, thereby implementing guidance for the user's face posture and solving the problem in the prior art about failure to provide photo-taking guidance while the user finds view.

According to an aspect of the present disclosure, there is provided a photo-taking prompting method, comprising:

collecting the user's image information while finding view;

obtaining the user's face posture information from the image information;

comparing face posture information of a preset photo-taking template with the user's face posture information, and prompting the user to adjust the face posture according to a comparison result.

The above aspect and any possible implementation mode further provide an implementation mode: obtaining the user's face posture information from the image information comprises:

performing face detection for the image information, and determining face position in the image information;

positioning key points of the face according to the face position in the image information;

obtaining the user's face posture information according to positioning results of the key points of the face.

The above aspect and any possible implementation mode further provide an implementation mode: positioning key points of the face according to the face position in the image information comprises:

using a first regression model to detect face positions in the image information to determine a face organ region in the image information;

using a second regression model to detect the face organ region in the image information to obtain position information of key points of the face organs in the image information.

The above aspect and any possible implementation mode further provide an implementation mode: the face posture information comprises a space posture Euler angle of the user's face relative to a camera device.

The above aspect and any possible implementation mode further provide an implementation mode: obtaining the user's face posture information according to positioning results of the key points of the face comprises:

obtaining position information of preset standard key points;

calculating the space posture Euler angle of the user's face relative to the camera device according to position information of the key points of the face and the position information of the standard key points.

The above aspect and any possible implementation mode further provide an implementation mode: the comparing face posture information of a preset photo-taking template with the user's face posture information, and prompting the user to adjust the face posture according to a comparison result comprises:

obtaining difference data between the face posture information of the photo-taking template and the user's face posture information;

comparing the difference data with a preset difference threshold;

if the difference data is larger than or equal to the difference threshold, generating face posture adjustment prompting information;

outputting the face posture adjustment prompting information.

The above aspect and any possible implementation mode further provide an implementation mode: the method further comprises:

if the difference data between the face posture information of the photo-taking template and adjusted face posture information is smaller than the difference threshold, taking a photo for the user.

According to another aspect of the present disclosure, there is provided a photo-taking prompting apparatus, comprising:

a collecting unit configured to collect the user's image information while finding view;

an obtaining unit configured to obtain the user's face posture information from the image information;

a comparing unit configured to compare face posture information of a preset photo-taking template with the user's face posture information;

a prompting unit configured to prompt the user to adjust the face posture according to a comparison result.

The above aspect and any possible implementation mode further provide an implementation mode: the obtaining unit is specifically configured to:

perform face detection for the image information, and determine face position in the image information;

position key points of the face according to the face position in the image information;

obtain the user's face posture information according to positioning results of the key points of the face.

The above aspect and any possible implementation mode further provide an implementation mode: the obtaining unit, upon positioning key points of the face according to the face position in the image information, is specifically configured to:

use a first regression model to detect face positions in the image information to determine a face organ region in the image information;

use a second regression model to detect the face organ region in the image information to obtain position information of key points of the face organs in the image information.

The above aspect and any possible implementation mode further provide an implementation mode: the face posture information comprises a space posture Euler angle of the user's face relative to the camera device.

The above aspect and any possible implementation mode further provide an implementation mode: the obtaining unit, upon obtaining the user's face posture information according to positioning results of the key points of the face, is specifically configured to:

obtain position information of preset standard key points;

calculate the space posture Euler angle of the user's face relative to the camera device according to position information of the key points of the face and the position information of the standard key points.

The above aspect and any possible implementation mode further provide an implementation mode: the comparing unit is specifically configured to: obtain difference data between the face posture information of the photo-taking template and the user's face posture information, and then, compare the difference data with a preset difference threshold;

the prompting unit is specifically configured to: if the difference data is larger than or equal to the difference threshold, generate face posture adjustment prompting information; and output the face posture adjustment prompting information.

The above aspect and any possible implementation mode further provide an implementation mode: the collecting unit is further configured to:

take a photo for the user if the difference data between the face posture information of the photo-taking template and adjusted face posture information is smaller than the difference threshold.

According to a further aspect of the present disclosure, there is provided an apparatus, comprising one or more processors;

a memory;

one or more programs stored in the memory and configured to execute the following operations when executed by the one or more processors:

collecting the user's image information while finding view;

obtaining the user's face posture information from the image information;

comparing face posture information of a preset photo-taking template with the user's face posture information, and prompting the user to adjust the face posture according to a comparison result.

According to a further aspect of the present disclosure, there is provided a non-volatile computer storage medium in which one or more programs are stored, an apparatus being enabled to execute the following operations when said one or more programs are executed by the apparatus:

collecting the user's image information while finding view;

obtaining the user's face posture information from the image information;

comparing face posture information of a preset photo-taking template with the user's face posture information, and prompting the user to adjust the face posture according to a comparison result.

As known from the above technical solutions, the technical solutions of embodiments of the present disclosure achieve the following advantageous effects:

The technical solutions provided by embodiments of the present disclosure may implement prompting the user's face posture adjustment while the user finds view and thereby implement providing guidance for the user's face posture while the user finds view, can take photos of higher quality in time, and obtain the user's optimal postures in time, thereby improving photo-obtaining efficiency, solving the problem in the prior art about failure to perform photo-taking guidance while the user finds view, filling the blank in the prior art, and boosting the user's experience.

BRIEF DESCRIPTION OF DRAWINGS

To describe technical solutions of embodiments of the present disclosure more clearly, figures to be used in the embodiments or in depictions regarding the prior art will be described briefly. Obviously, the figures described below are only some embodiments of the present disclosure. Those having ordinary skill in the art appreciate that other figures may be obtained from these figures without making inventive efforts.

DETAILED DESCRIPTION OF PREFERRED EMBODIMENTS

The present disclosure will be described in detail in conjunction with figures and specific embodiments to make objectives, technical solutions and advantages of the present disclosure more apparent.

It should be appreciated that embodiments described here are only partial embodiments of the present disclosure, not all embodiments. Based on embodiments in the present disclosure, all other embodiments obtained by those having ordinary skill in the art without making inventive efforts all fall within the protection scope of the present disclosure.

Terms used in embodiments of the present disclosure are only intended to describe specific embodiments, not to limit the present disclosure. Singular forms "a", "said" and "the" used in embodiments and claims of the present disclosure are also intended to include plural forms, unless other senses are clearly defined in the context.

It should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Depending on the context, the word "if" as used herein may be construed as "at the time when . . ." or "when . . ." or "responsive to determining" or "responsive to detecting". Similarly, depending on the context, phrases "if . . . is determined" or "if . . . (stated condition or event) is detected" may be construed as "when . . . is determined" or "responsive to determining" or "when . . . (stated condition or event) is detected" or "responsive to detecting (stated condition or event)".

Figure 1:
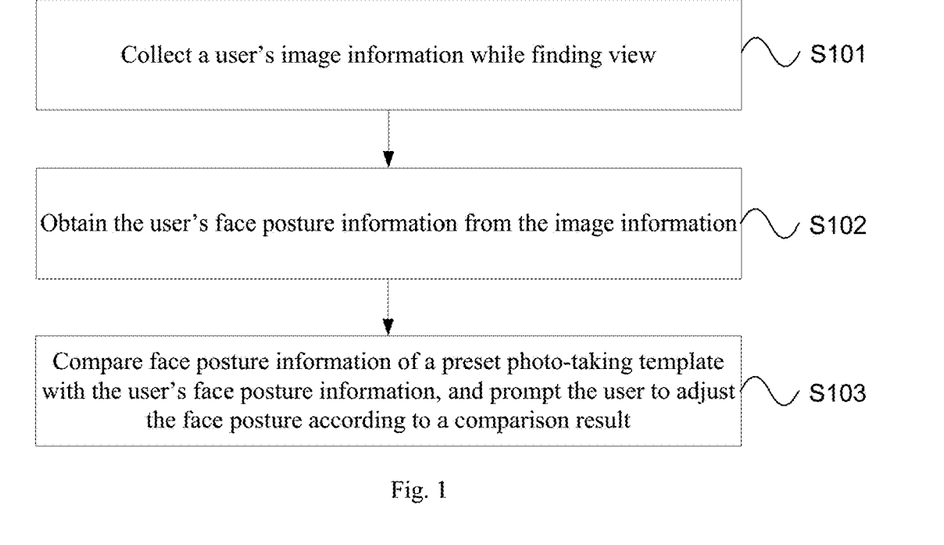
FIG. 1 is a flow chart of a photo-taking prompting method according to an embodiment of the present disclosure.

Embodiments of the present disclosure provide a photo-taking prompting method. Reference is made to FIG. 1 which is a flow chart of a photo-taking prompting method according to an embodiment of the present disclosure. As shown in FIG. 1, the method comprises the following steps:

S101: collecting the user's image information while finding view;

S102: obtaining the user's face posture information from the image information;

S103: comparing face posture information of a preset photo-taking template with the user's face posture information, and prompting the user to adjust the face posture according to a comparison result.

It needs to be appreciated that the terminal involved in the embodiment of the present disclosure comprises but is not limited to a Personal Computer (PC), a Personal Digital Assistant (PDA), a wireless handheld device, a tablet computer, a mobile phone, an MP3 player, an MP4 player and the like.

It needs to be appreciated that a subject for implementing S101-S103 may be a photo-taking prompting apparatus, the apparatus may be located in an application of a local terminal, or may further be a function unit such as a plug-in or Software Development Kit (SDK) located in the application of the local terminal. This is not particularly limited in the present embodiment.

It may be understood that the application may be a native application (nativeAPP) installed on the terminal, or a web application (webAPP) of a browser on the terminal. This is not specifically limited in the present embodiment.

In a specific implementation procedure, during finding view, a camera may be used to collect the user's image information in real time.

For example, in the embodiment of the present disclosure, a method of obtaining the user's face posture information from the image information may include but is not limited to:

First, performing face detection for the image information, and determining face position in the image information; then, positioning key points of face organs according to the face position in the image information; and then obtaining the user's face posture according to positioning results of the key points of the face organs.

In a specific implementation procedure, performing face detection for the image information may determine the number of faces in the image information and the face position of each face.

In a specific implementation procedure, it is feasible to use a face detector obtained by pre-learning to perform multi-scale sliding window search for the collected image information to find all faces existing in the image information.

For example, the face detector may be implemented using Adaboost algorithm.

For example, a number of segmented face images and a number of background images may be used as training samples. The training samples are normalized to dimensions 20*20. Then Adaboost algorithm is used to screen effective haar features from the training samples, and the screened effective haar features are used to form the face detector.

For example, the face detector sets a sliding window for the image information. Regarding the image information in the sliding window, whether the image information includes faces is recognized according to the haar features of the image information, so that it is feasible to obtain all sub-windows including the faces, and position all faces in the image information according to these sub-windows.

For example, in the present embodiment, a method of positioning key points of the face includes but is not limited to:

First, obtaining a model which is obtained by pre-learning, capable of normalizing all key points and comprises a first regression model and a second regression model; then, using the first regression model to detect face positions in the image information to determine a face organ region in the image information; finally, using the second regression model to detect the face organ region in the image information to obtain position information of key points of the face organs in the image information.

It should be appreciated that although embodiments in the present disclosure might use the technical terms the first regression model and the second regression model, to the describe the regression model, these regression models should not be limited these terms. These terms are only used to distinguish these regression models from each other. For example, without departing from the scope of embodiments of the present disclosure, the first regression model may be also called the second regression model, and similarly, the second regression model may also be called the first regression model.

In embodiments of the present disclosure, the face organs may include eyes, mouth, eyebrow, nose and the like.

In embodiments of the present disclosure, the key points of the face may include but are not limited to: key points of the face organs and key points of a face contour.

In a specific implementation procedure, it is feasible to first use the first regression model to detect the face position in the image information to obtain the position information of the key points of the face, and then determine the face organ region in the image information according to the position information of the key points of the face.

It may be appreciated that the face organ region in the image information may comprise at least one face organ region, so the second regression model is used to detect each face organ region in the image information, to obtain the position information of the key points of each face organ region.

In embodiments of the present disclosure, the position information of the key points refers to coordinates of the key points in the image.

For example, the first regression model is used to detect the face position in the image information to obtain position information of two mouth corners in the face, and a mouth region in the image information may be determined according to the position information of the two mouth corners. The second regression model is used to detect the mouth region to obtain position information of key points of the mouth region.

It needs to be appreciated that the position information of the key points of the face detected using the first regression model has a lower precision, and the number of detected key points is relatively small. To improve the precision of the key point position information and the number of key points, it is further necessary to use the second regression model to perform detection for the face organ region to obtain a larger number of key points of the face organ region, and obtain more precise position information of the key points.

Alternatively, the second regression model may not be used, and only the first regression model is used to perform detection for the face position in the image information to obtain the position information of key points of the face, and consider the position information directly as the position information of the key points of the face organs in the image information.

It may be appreciated that the first regression model and the second regression model may be implemented using different key point detecting models, or implemented using the same key point detecting models. This is not specifically limited in embodiments of the present disclosure.

For example, the key point detecting model may include but is not limited to: Deep Convolution Neural Network (DCNN), Supervised Descent Method (SDM) or Active Shape Model (ASM).

For example, a method of using ASM to perform detection for the face position in the image information to obtain the key points of the face in the image information may include: a training procedure and a key point searching procedure.

The training procedure includes: collecting a lot of training samples and then manually marking key points of each face in the training sample, forming feature vectors with coordinates of the key points of the same face, performing alignment operation for the feature vectors formed by the coordinates of the key points of each face, performing Principal Components Analysis (PCA) operation for the shapes of the aligned faces to eliminate the influence exerted by non-shape factors on the training samples, and establishing the ASM as the key point detecting model in the embodiments of the present disclosure.

The key point searching procedure comprises: after obtaining the ASM after training the training samples, using the ASM to perform ASM search. First, the ASM is used to search for a target shape in the image information in which the key points need to be detected, so that the key points in the found final shape are the most approximate to the corresponding true key points. The searching procedure ends up when searching and iterating times reach a designated threshold.

Figure 2A:
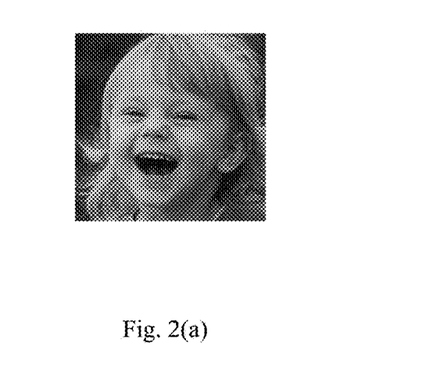
FIGS. 2(a)-2(d) are exemplary views of key points of face organs provided by an embodiment of the present disclosure.
Figure 2B:
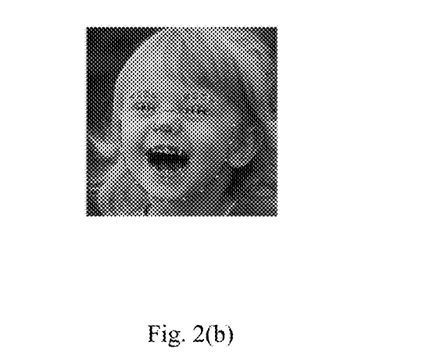
Figure 2C:
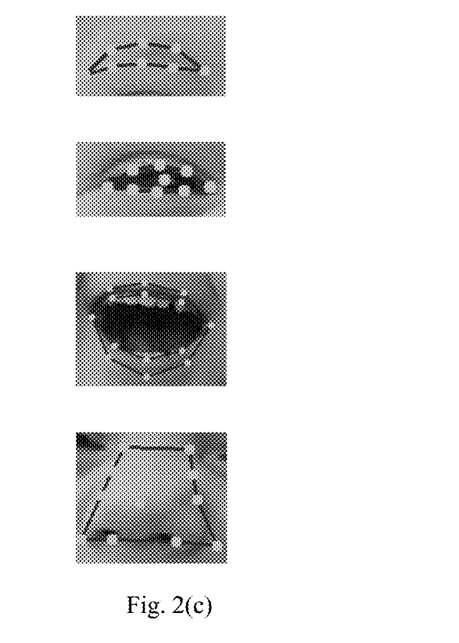
Figure 2D:
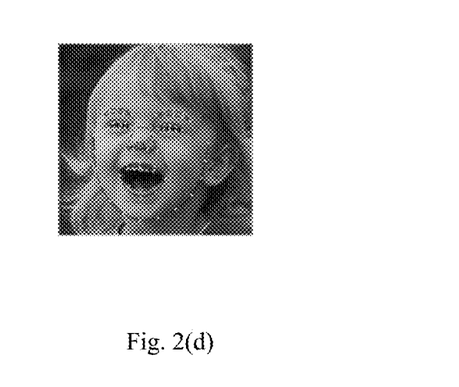

For example, reference is made to FIG. 2(a)-FIG. 2(b) which are exemplary views of key points of face organs provided by an embodiment of the present disclosure. As shown in FIG. 2(a), a face of a little girl in the image information may be recognized by performing face detection for the image information. As shown in FIG. 2(b), the first regression model is used to detect the face position and position several key points. As shown in FIG. 2(c), several face organ regions, for example, eyebrow, eye, mouth and nose in the figure, may be obtained by dividing according to the positioned several key points, and then the second regression model is used to respectively perform detection for each face organ region, and position several key points of each face organ. As shown in FIG. 2(d), key points of face organs and key points of the face contour are finally obtained.

Preferably, in embodiments of the present disclosure, the face posture information may comprise a space posture Euler angle of the user's face relative to the camera device.

For example, in embodiments of the present disclosure, a method of obtaining the user's face posture information according to positioning results of the key points of the face may include but is not limited to:

First, obtaining position information of preset standard key points, then, calculating the space posture Euler angle of the user's face relative to the camera device according to position information of the key points of the face and the position information of the standard key points.

In a specific implementation procedure, it is feasible to, by means of a Pose from Orthography and Scaling with Iterations (POSIT) algorithm and according to the position information of key points on the face organs and position information of the standard key points, calculate the space posture Euler angle of the key points on the face organs relative to the standard key points, and use it as the space posture Euler angle of the user's face relative to the camera device in the embodiments of the present disclosure, namely, as the user's face posture information in embodiments of the present disclosure.

It may be appreciated that the camera device may be a camera collecting the user's image information, or, the camera device may be a terminal where the camera lies, such as a mobile phone, a camera, a tablet computer or the like.

For example, in embodiments of the present disclosure, a method of comparing face posture information of a preset photo-taking template with the user's face posture information, and prompting the user to adjust the face posture according to a comparison result may include but is not limited to:

First, obtaining difference data between the face posture information of the photo-taking template and the user's face posture information; then comparing the difference data with a preset difference threshold; finally, if the difference data is larger than or equal to the difference threshold, generating face posture adjustment prompting information; and outputting the face posture adjustment prompting information; if the difference data between the face posture information of the photo-taking template and adjusted user's face posture information is smaller than the difference threshold, taking a photo for the user.

In a specific implementation procedure, the photo-taking template may be a photo-taking template pre-selected by the user, or the photo-taking template may be obtained automatically according to the image information. For example, the photo-taking template matching with the image information may be obtained by searching in a template library according to any one of the number of faces in the image information, background in the image information and the face posture information. The manner of obtaining the photo-taking template is not specifically limited in embodiments of the present disclosure.

Preferably, the face posture information of the photo-taking template may include the space posture Euler angle of the face in the photo-taking template relative to the camera device.

In a specific implementation procedure, it is feasible to calculate a differential value between the space posture Euler angle of the user's face relative to the camera device and the space posture Euler angle of the face in the photo-taking template relative to the camera device, as the difference data.

It may be appreciated that when the difference data is larger than or equal to the difference threshold, it is believed that the difference between the face posture information of the photo-taking template and the user's face posture information is larger, so there is a need to promote the user of adjusting the face posture and therefore the face posture adjustment prompting information is output to the user. As such, the user may, according to the face posture adjustment prompting information, adjust his own face posture, implement guidance for the user's photo-taking posture while the user finds view, improve the user's photo-taking efficiency and bring about an excellent user experience.

In addition, when the difference data is smaller than the difference threshold, it is believed that the difference between the face posture information of the photo-taking template and the user's face posture information is smaller, so a photo can be taken directly without requiring the user to adjust the face posture, and the photo-taking operation of this time can be completed.

Preferably, the face posture adjusting prompting information may be speech information for prompting the user to adjust the face posture, or may be displayed information prompting the user to adjust the face posture.

For example, the speech information for prompting the user to adjust the face posture may be "please raise your chin" or "turn your face to the left more".

Or, for example, the displayed information prompting the user to adjust the face posture may be marking, on an interface, face position to be adjusted by the user and adjustment direction.

Embodiments of the present disclosure further provide an apparatus embodiment for implementing steps and method in the above method embodiment.

Figure 3:
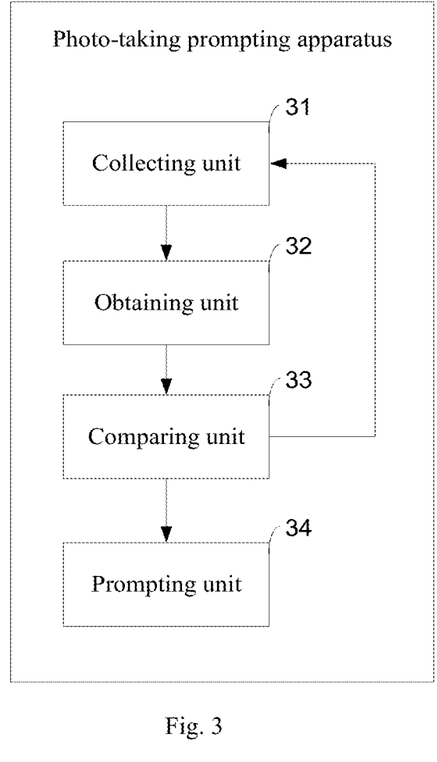
FIG. 3 is a block diagram of a photo-taking prompting apparatus according to a further embodiment of the present disclosure.

Reference is made to FIG. 3 which is a block diagram of a photo-taking prompting apparatus according to a further embodiment of the present disclosure. As shown in FIG. 3, the apparatus comprises:

a collecting unit 31 configured to collect the user's image information while finding view;

an obtaining unit 32 configured to obtain the user's face posture information from the image information;

a comparing unit 33 configured to compare face posture information of a preset photo-taking template with the user's face posture information;

a prompting unit 34 configured to prompt the user to adjust the face posture according to a comparison result.

In a specific implementation procedure, the obtaining unit 32 is specifically configured to:

perform face detection for the image information, and determine face position in the image information;

position key points of the face according to the face position in the image information;

obtain the user's face posture information according to positioning results of the key points of the face.

In a specific implementation procedure, the obtaining unit 32, upon positioning key points of the face according to the face position in the image information, is specifically configured to:

use a first regression model to detect face positions in the image information to determine a face organ region in the image information;

use a second regression model to detect the face organ region in the image information to obtain position information of key points of the face organs in the image information.

In a specific implementation procedure, the face posture information comprises a space posture Euler angle of the user's face relative to the camera device.

In a specific implementation procedure, the obtaining unit 32, upon obtaining the user's face posture information according to positioning results of the key points of the face, is specifically configured to:

obtain position information of preset standard key points;

calculate the space posture Euler angle of the user's face relative to the camera device according to position information of the key points of the face and the position information of the standard key points.

In a specific implementation procedure, the comparing unit 33 is specifically configured to: obtain difference data between the face posture information of the photo-taking template and the user's face posture information; and compare the difference data with a preset difference threshold;

The prompting unit 34 is specifically configured to: if the difference data is larger than or equal to the difference threshold, generate face posture adjustment prompting information and output the face posture adjustment prompting information.

Optionally, in a possible implementation mode of the present embodiment, the collecting unit 31 is further configured to:

take a photo for the user if the difference data between the face posture information of the photo-taking template and adjusted face posture information is smaller than the difference threshold.

As units in the present embodiment can execute the method shown in FIG. 1, reference may be made to the depictions with respect to FIG. 1 for portions not described in detail in the present embodiment.

The technical solutions of embodiments of the present disclosure achieve the following advantageous effects:

In embodiments of the present disclosure, the user's image information is collected while the user finds view, then the user's face posture information is obtained from the image information, then face posture information of a preset photo-taking template is compared with the user's face posture information, and the user is prompted to adjust the face posture according to a comparison result.

The technical solutions provided by embodiments of the present disclosure may implement prompting the user's face posture adjustment while the user finds view and thereby implement providing guidance for the user's face posture while the user finds view, can take photos of higher quality in time, and obtain the user's optimal postures in time, thereby improving photo-obtaining efficiency, solving the problem in the prior art about failure to perform photo-taking guidance while the user finds view, filling the blank in the prior art, and boosting the user's experience.

Those skilled in the art can clearly understand that for purpose of convenience and brevity of depictions, reference may be made to corresponding procedures in the aforesaid method embodiments for specific operation procedures of the system, apparatus and units described above, which will not be detailed any more.

In the embodiments provided by the present disclosure, it should be understood that the revealed system, apparatus and method can be implemented through other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, read-only memory (ROM), a random access memory (RAM), magnetic disk, or an optical disk.

What are stated above are only preferred embodiments of the present disclosure, not intended to limit the disclosure. Any modifications, equivalent replacements, improvements and the like made within the spirit and principles of the present disclosure, should all be included in the present disclosure within the scope of protection.

What is claimed is:

1. A photo-taking prompting method, wherein the method comprises:
    collecting a user's image information while finding view;
    obtaining the user's face posture information from the image information;
    comparing face posture information of a preset photo-taking template with the user's face posture information, and prompting the user to adjust the face posture according to a comparison result,
    wherein obtaining the user's face posture information from the image information comprises:
    performing face detection for the image information, and determining face position in the image information;
    positioning key points of the face according to the face position in the image information;
    obtaining the user's face posture information according to positioning results of the key points of the face,
    and wherein positioning key points of the face according to the face position in the image information comprises:
    using a first regression model to detect face positions in the image information to determine a face organ region in the image information;
    using a second regression model to detect the face organ region in the image information to obtain position information of key points of the face organs in the image information,
    wherein the preset photo-taking template is obtained by searching in a template library according to one of a number of faces in the image information, background in the image information and the face posture information.

2. The method according to claim 1, wherein the face posture information comprises a space posture Euler angle of the user's face relative to a camera device.

3. The method according to claim 2, wherein obtaining the user's face posture information according to positioning results of the key points of the face comprises:
    obtaining position information of preset standard key points;
    calculating the space posture Euler angle of the user's face relative to the camera device according to position information of the key points of the face and the position information of the standard key points.

4. The method according to claim 1, wherein the comparing face posture information of a preset photo-taking template with the user's face posture information, and prompting the user to adjust the face posture according to a comparison result comprises:
    obtaining difference data between the face posture information of the photo-taking template and the user's face posture information;
    comparing the difference data with a preset difference threshold;
    if the difference data is larger than or equal to the difference threshold, generating face posture adjustment prompting information;
    outputting the face posture adjustment prompting information.

5. The method according to claim 4, wherein the method further comprises:
    if the difference data between the face posture information of the photo-taking template and adjusted face posture information is smaller than the difference threshold, taking a photo for the user.

6. An apparatus, comprising
    one or more processors;
    a memory;
    one or more programs stored in the memory and configured to execute the following operation when executed by the one or more processors:
    collecting a user's image information while finding view;
    obtaining the user's face posture information from the image information;
    comparing face posture information of a preset photo-taking template with the user's face posture information, and prompting the user to adjust the face posture according to a comparison result,
    wherein the operation of obtaining the user's face posture information from the image information comprises:
    performing face detection for the image information, and determining face position in the image information;
    positioning key points of the face according to the face position in the image information;
    obtaining the user's face posture information according to positioning results of the key points of the face,
    and where in the operation of positioning key points of the face according to the face position in the image information comprises:
    using a first regression model to detect face positions in the image information to determine a face organ region in the image information;

using a second regression model to detect the face organ region in the image information to obtain position information of key points of the face organs in the image information, wherein the preset photo-taking template is obtained by searching in a template library according to one of a number of faces in the image information, background in the image information and the face posture information.

7. The apparatus according to claim 6, wherein
the face posture information comprises a space posture Euler angle of the user's face relative to a camera device.

8. The apparatus according to claim 7, wherein
the operation of obtaining the user's face posture information according to positioning results of the key points of the face comprises:
obtaining position information of preset standard key points;
calculating the space posture Euler angle of the user's face relative to the camera device according to position information of the key points of the face and the position information of the standard key points.

9. The apparatus according to claim 6, wherein
the operation of comparing face posture information of a preset photo-taking template with the user's face posture information, and prompting the user to adjust the face posture according to a comparison result comprises:
obtaining difference data between the face posture information of the photo-taking template and the user's face posture information;
comparing the difference data with a preset difference threshold;
if the difference data is larger than or equal to the difference threshold, generating face posture adjustment prompting information;
outputting the face posture adjustment prompting information.

10. The apparatus according to claim 9, wherein
the operation further comprises:
if the difference data between the face posture information of the photo-taking template and adjusted face posture information is smaller than the difference threshold, taking a photo for the user.

11. A non-transitory computer storage medium in which one or more programs are stored, an apparatus being enabled to execute the following operations when said one or more programs are executed by the apparatus:
collecting a user's image information while finding view;
obtaining the user's face posture information from the image information;
comparing face posture information of a preset photo-taking template with the user's face posture information, and prompting the user to adjust the face posture according to a comparison result,
wherein the operation of obtaining the user's face posture information from the image information comprises:
performing face detection for the image information, and determining face position in the image information;
positioning key points of the face according to the face position in the image information;
obtaining the user's face posture information according to positioning results of the key points of the face,
and wherein the operation of positioning key points of the face according to the face position in the image information comprises:
using a first regression model to detect face positions in the image information to determine a face organ region in the image information;
using a second regression model to detect the face organ region in the image information to obtain position information of key points of the face organs in the image information,
wherein the preset photo-taking template is obtained by searching in a template library according to one of a number of faces in the image information, background in the image information and the face posture information.

12. The non-transitory computer storage medium according to claim 11, wherein
the face posture information comprises a space posture Euler angle of the user's face relative to a camera device.

13. The non-transitory computer storage medium according to claim 12, wherein
the operation of obtaining the user's face posture information according to positioning results of the key points of the face comprises:
obtaining position information of preset standard key points;
calculating the space posture Euler angle of the user's face relative to the camera device according to position information of the key points of the face and the position information of the standard key points.

14. The non-transitory computer storage medium according to claim 11, wherein
the operation of comparing face posture information of a preset photo-taking template with the user's face posture information, and prompting the user to adjust the face posture according to a comparison result comprises:
obtaining difference data between the face posture information of the photo-taking template and the user's face posture information;
comparing the difference data with a preset difference threshold;
if the difference data is larger than or equal to the difference threshold, generating face posture adjustment prompting information;
outputting the face posture adjustment prompting information.

15. The non-transitory computer storage medium according to claim 14, wherein
the operation further comprises:
if the difference data between the face posture information of the photo-taking template and adjusted face posture information is smaller than the difference threshold, taking a photo for the user.

* * * * *